United States Patent
Bahl et al.

(10) Patent No.: US 8,311,822 B2
(45) Date of Patent: Nov. 13, 2012

(54) METHOD AND SYSTEM OF ENABLING INTELLIGENT AND LIGHTWEIGHT SPEECH TO TEXT TRANSCRIPTION THROUGH DISTRIBUTED ENVIRONMENT

(75) Inventors: Amarjit S. Bahl, Brookfield, CT (US); Dalia Massoud, Naugatuck, CT (US); Dikran S. Meliksetian, Danbury, CT (US); Chen Shu, Oakville, CT (US); Michael Van Der Meulen, Woodbridge, CT (US); Nianjun Zhou, Somers, NY (US)

(73) Assignee: Nuance Communications, Inc., Burlington, MA (US)

( * ) Notice: Subject to any disclaimer, the term of this patent is extended or adjusted under 35 U.S.C. 154(b) by 646 days.

(21) Appl. No.: 10/979,334

(22) Filed: Nov. 2, 2004

(65) Prior Publication Data

US 2006/0095259 A1  May 4, 2006

(51) Int. Cl.
*G10L 15/26* (2006.01)
*G10L 15/00* (2006.01)
*G10L 15/04* (2006.01)

(52) U.S. Cl. .......................... 704/235; 704/231; 704/251
(58) Field of Classification Search .................. 704/231, 704/235, 270.1, E15.039, E15.043, E15.047, 704/251, 270; 370/351; 707/104.1
See application file for complete search history.

(56) References Cited

U.S. PATENT DOCUMENTS

| | | | |
|---|---|---|---|
| 5,897,616 A | 4/1999 | Kanevsky et al. | |
| 5,953,700 A | 9/1999 | Kanevsky et al. | |
| 6,003,083 A * | 12/1999 | Davies et al. | 709/226 |
| 6,173,259 B1 * | 1/2001 | Bijl et al. | 704/235 |
| 6,356,947 B1 * | 3/2002 | Lutterschmidt | 709/231 |
| 6,766,295 B1 * | 7/2004 | Murveit et al. | 704/243 |
| 6,785,647 B2 * | 8/2004 | Hutchison | 704/231 |
| 6,785,654 B2 * | 8/2004 | Cyr et al. | 704/270.1 |
| 6,801,604 B2 * | 10/2004 | Maes et al. | 379/88.17 |
| 7,133,829 B2 * | 11/2006 | Cyr et al. | 704/270.1 |
| 7,305,490 B2 * | 12/2007 | Metz et al. | 709/247 |
| 2002/0091511 A1 | 7/2002 | Hellwig et al. | |
| 2002/0091527 A1 * | 7/2002 | Shiau | 704/270.1 |
| 2002/0143856 A1 | 10/2002 | Sastri et al. | |
| 2002/0156626 A1 | 10/2002 | Hutchison | |
| 2002/0184373 A1 | 12/2002 | Maes | |
| 2003/0014254 A1 * | 1/2003 | Zhang et al. | 704/260 |
| 2003/0083883 A1 | 5/2003 | Cyr et al. | |
| 2003/0125950 A1 | 7/2003 | Avila et al. | |
| 2003/0130854 A1 | 7/2003 | Galanes et al. | |
| 2003/0174155 A1 | 9/2003 | Weng et al. | |
| 2003/0236665 A1 | 12/2003 | Sharma | |
| 2004/0006474 A1 | 1/2004 | Gong et al. | |
| 2004/0162731 A1 * | 8/2004 | Yamada et al. | 704/270.1 |

* cited by examiner

*Primary Examiner* — Jesse Pullias
(74) *Attorney, Agent, or Firm* — Wolf, Greenfield & Sacks, P.C.

(57) ABSTRACT

A system includes at least one wireless client device, a service manager, and a plurality of voice transcription servers. The service manager includes a resource management service and a profile management service. The client device communicates the presence of a voice transcription task to the resource management service. The resource management service surveys the plurality of voice transcription servers and selects one voice transcription server based on a set of predefined criteria. The resource management service then communicated an address of the selected server to the profile management service, which then transmits a trained voice profile or default profile to the selected server. The address of the selected server is then sent to the client device, which then transmits an audio stream to the server. Finally, the selected server transcribes the audio stream to a textual format.

30 Claims, 5 Drawing Sheets

METHOD AND SYSTEM OF ENABLING INTELLIGENT AND LIGHTWEIGHT SPEECH TO TEXT TRANSCRIPTION THROUGH DISTRIBUTED ENVIRONMENT

BACKGROUND OF THE INVENTION

1. Field of the Invention

The present invention relates generally to voice-to-text transcription and more particularly, to voice-to-text transcription for pervasive devices, instant messengers, and web browsers over a distributed environment.

2. Background of the Invention

With the growing popularity of pervasive devices (e.g., palm-tops, personal digital assistants (PDAs), cellular telephones, smart-phones, etc.) and the increasing bandwidth for wired and wireless communications, it is becoming more and more feasible to enable intelligent applications that provide more sophisticated services. Usually, these pervasive devices have the following features: they are physically small, have limited memory and computational power, and wirelessly communicate with other devices or systems.

Instant message clients, which include the AOL, MSN and Yahoo instant message services, and the like, are prevalent in the marketplace to provide real time communication using text among the different end-users. One of the efficient methods of input is using voice transcription. Rather than to make the instant message client heavy to support transcription, we could dispatch the transcription task to the server to reduce the resource requirement and consumption at the client side.

Web-browser client devices, which include kiosks, personal computers, notebook computers, Internet appliance, and the like, are prevalent in the marketplace. Many web-browser client devices depend on remote resources for computation and storage functions and do not have the capacity themselves to store the sophisticated software and run the applications of the software.

One such sophisticated application is voice-to-text transcription, where a user can simply speak to the pervasive, instance message client through a lightweight voice plug-in or web-browser client device and the recorded audio stream is processed and transcribed to a text format. The versatile, memory-efficient, text format can then be saved, transmitted to other devices, printed, or any of several other similar functions. However, accurately converting an audio voice stream to text is a complicated process. This process is further complicated by varying dialects, inflections, accents, and other speech characteristics of users.

In order to get more accurate transcription results, the solution needs to be personalized for the end-user. Several prior-art techniques utilize stored, trained, voice profiles. A trained voice profile is a conversion table that matches a user's vocal characteristics to known letter sounds. The profile is usually created by having the user utter a series of pre-selected words. The user's voice is then cross-referenced to the letter sounds. A transcription engine then employs the trained voice profile to produce a more accurate conversion from voice to text.

As the resolution of the profile increases, so too does its size and required system resources. Similarly, the more sophisticated the transcription engine, the more system resources that are required to execute the transcription tasks. To this end, it is impractical for a pervasive device, instant messenger, or web browser to store the trained voice profile and execute the transcription itself.

Several prior-art methods have been to transmit audio-voice data from the pervasive devices or web browsers to a central server containing a transcription engine that performs the arduous computations needed for accurate transcription service. However, as the number of users grows, so too does the demand on the central transcription server, which has finite resources available for the transcription tasks. Additionally, as the geographic location of the users expands, the use of a single centralized transcription server becomes impractical.

Accordingly, a need exists for a solution to enable sophisticated voice applications on low-end pervasive, instant message, and web-browser devices that scale with the number of users as well as the geographic locations of the end-users.

SUMMARY OF THE INVENTION

The present invention provides a scalable solution to enable sophisticated voice applications on low-end pervasive and web-browser client devices using a distributed computation model. At least three components are provided: a service manager, one or more voice transcription servers, and one or more lightweight clients.

The present invention includes a pool of remote voice transcription servers. When a voice audio stream is input into a client device, the transcription task is dispatched to the pool of remote voice transcription servers using TCP/IP communication or other communication manners. A service manager includes a resource management service that selects a member of the voice transcription server pool to handle a particular service request based on a set of criteria, which includes, among other factors, distance between a client device and a voice transcription server, the network traffic bandwidth from a client device to a transcription server, and the available computation resources of a transcription server.

Furthermore, a profile management service in the service manager holds and dispatches trained voice profiles to provide immediate dynamic deployment of the personalized profiles to each assigned voice transcription engine. The trained profiles provide greater accuracy in the transcription process.

The present invention, therefore, provides a distributed computing mechanism, i.e., transcription engines that are distributed, not necessary identical, easily managed, and that support potential huge requests from end-users for service.

In one embodiment of the present invention a format transformation module allows transcription of multiple voice formats as part of the functions of the voice transcription server. In a further embodiment of the present invention, audio is transferred at the same time the end-user is recording to expedite the speed of communications between the lightweight client and voice transcription server.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

Described now is an exemplary hardware platform according to an exemplary embodiment of the present invention. The hardware platform includes three main components: a service manager, at least one voice transcription server, and a lightweight client device.

Due to the steady advances in technology, fully operating computers are now available in palm-top or hand-held devices, such as personal digital assistants (PDAs), in-vehicle devices, business organizers, and the like. In addition, many people now utilize cellular telephones to access the Internet and to perform various other computing functions. Portable computing devices including, but not limited to, palm-tops, PDAs, and cellular telephones are often collectively referred to as "pervasive" computing devices.

Overall System

Figure 1:
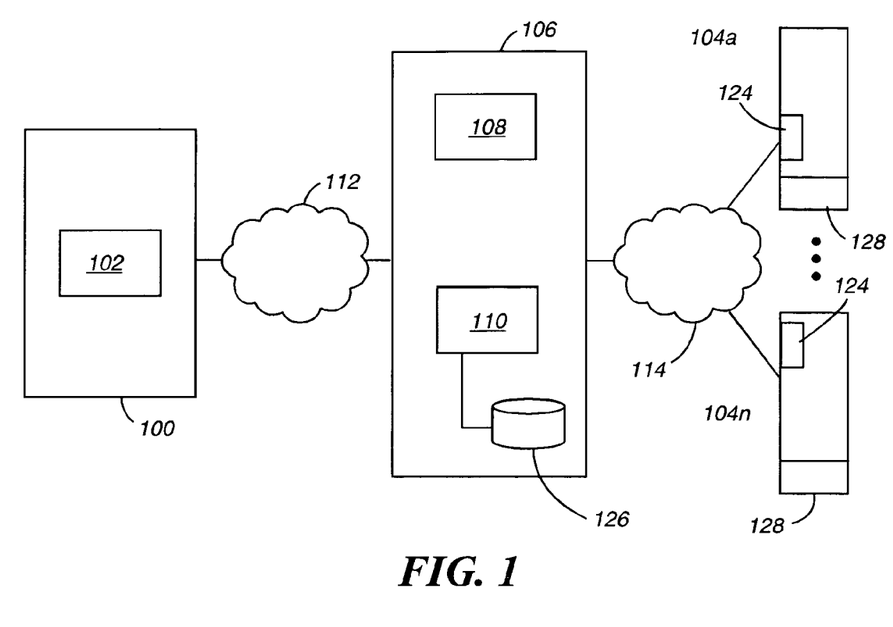
FIG. 1 is a block diagram of an overall system illustrating one embodiment of a voice transcription system using a pervasive client device, according to the present invention.

The present invention is implemented on servers in a computer network such as the Internet. Referring now to FIG. 1, a lightweight client device 100 is shown. There are different kinds of lightweight clients. The following are three examples: i) pervasive client (e.g., a PDA, Palm computer, or cellular telephone); ii) instant message; and ii) web browser client (e.g., personal computer, notebook computer, or Internet appliance). The client device 100 may include an operating system such as Microsoft Windows™, Microsoft Windows™ CE, or Palm™ OS™. The device 100 may also include a suite of Internet tools, such as a Web browser application to access a distributed voice transcription server 104a-n via a service manager 106 over network 112 and network 114.

Service manager gateway computer 106 or just service manager 106 includes a resource management service 108 and a profile management service 110.

Generalized Architecture for Service Manager 106 and Voice Transcription Server 104

Figure 2:
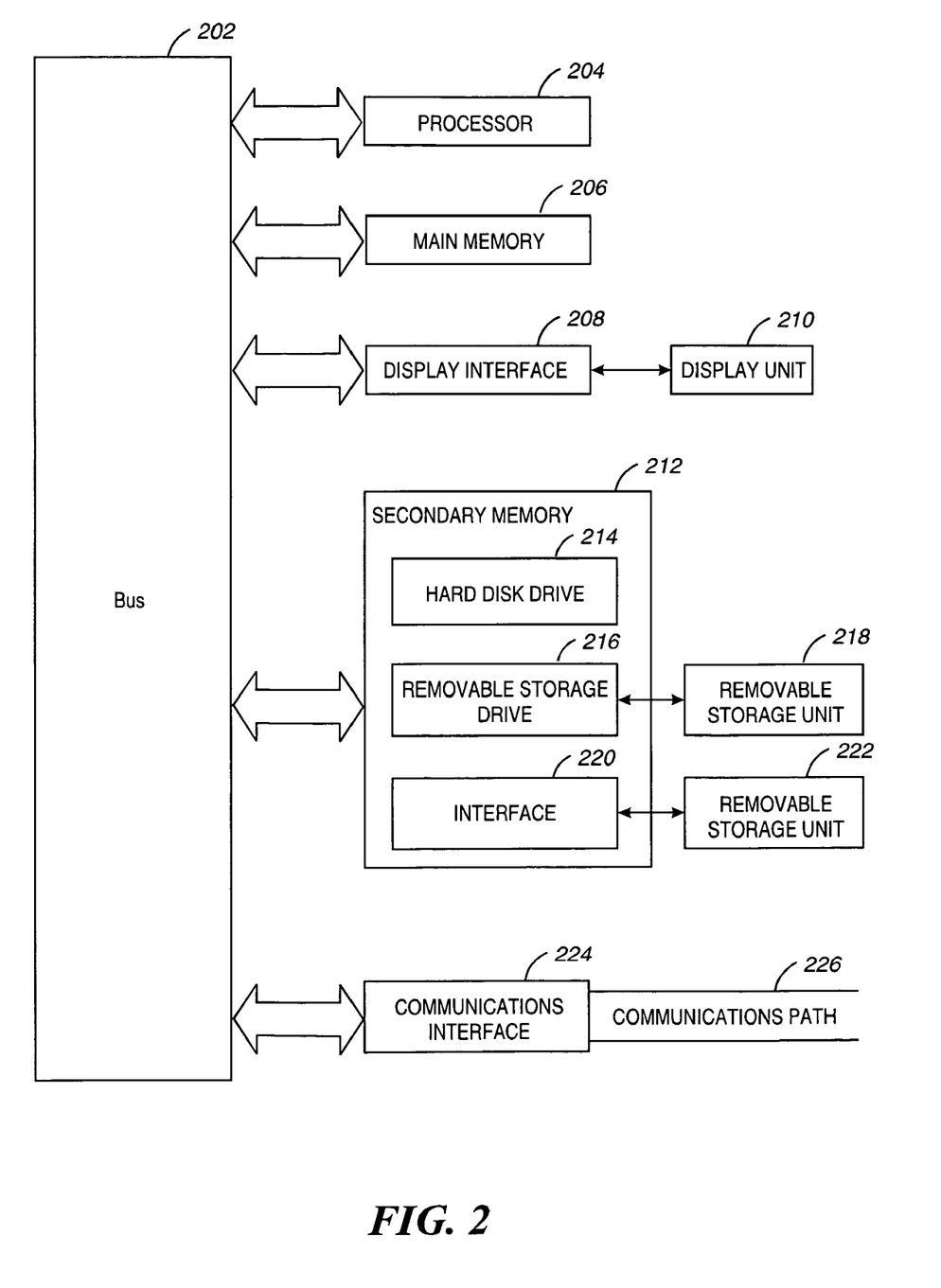
FIG. 2 is a hardware block diagram illustrating one embodiment of a server device, according to the present invention.

FIG. 2 is a block diagram of a computer system useful for implementing an embodiment of the present invention. The computer system includes one or more processors, such as processor 204. The processor 204 is connected to a communication infrastructure 202 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 208 that forwards graphics, text, and other data from the communication infrastructure 202 (or from a frame buffer not shown) for display on the display unit 210. The computer system also includes a main memory 206, preferably random access memory (RAM), and may also include a secondary memory 212. The secondary memory 212 may include, for example, a hard disk drive 214 and/or a removable storage drive 216, representing a floppy disk drive, a magnetic tape drive, an optical disk drive, etc. The removable storage drive 216 reads from and/or writes to a removable storage unit 218 in a manner well known to those having ordinary skill in the art. Removable storage unit 218, represents a floppy disk, magnetic tape, optical disk, etc. which is read by and written to by removable storage drive 216. As will be appreciated, the removable storage unit 218 includes a computer usable storage medium having stored therein computer software and/or data.

In alternative embodiments, the secondary memory 212 may include other similar means for allowing computer programs or other instructions to be loaded into the computer system. Such means may include, for example, a removable storage unit 222 and an interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to the computer system.

The computer system may also include a communications interface 224. Communications interface 224 allows software and data to be transferred between the computer system and external devices. Examples of communications interface 224 may include a modem, a network interface (such as an Ethernet card), a communications port, a PCMCIA slot and card, etc. Software and data transferred via communications interface 224 are in the form of signals which may be, for example, electronic, electromagnetic, optical, or other signals capable of being received by communications interface 224. These signals are provided to communications interface 224 via a communications path (i.e., channel) 226. This channel 226 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 206 and secondary memory 212, removable storage drive 216, a hard disk installed in hard disk drive 214, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 206 and/or secondary memory 212. Computer programs may also be received via communications interface 224. Such computer programs, when executed, enable the computer system to perform the features of the present invention as discussed herein. In particular, the computer programs, when executed, enable the processor 204 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

The distributed voice transcription servers 104a-104, in one embodiment are substantially the identical platform. It is important to note, however, that in another embodiment, the voice transcription servers are a diverse variety of platforms each with different processors, operating systems, I/O capability and voice transcription software.

The voice transcription servers 104a-n are operable to execute an audio voice transcription program, which processes an audio voice input and generates a textual transcription. The voice transcription software (not shown) is any available voice transcription product available from IBM, AT&T, Dragon Systems, Microsoft and others.

Data transfers between the resource manager 106 and client device 100 and voice transcription servers 104a-n typically conform to the TCP/IP specification, as well as File Transfer Protocol (FTP), HyperText Transfer Protocol (HTTP), or some similar communications protocol, and such communications may be made over a secure connection over network 112 and network 114.

In a preferred embodiment, the implementation of the service manager 106 and the voice transcription servers 104a-n are realized using the grid-computing model, such as Globus™ GT3™ (found at http:/www.globus.org/gt3/). In one embodiment, the voice transcription server 104a-n is deployed as a grid service using the GT3™ grid tools. In this embodiment, the voice transcription server 104a-n is deployed and enabled automatically using the Grid data management and resources management systems. The text transcription becomes one of the grid services provided by a grid system. The service manager 106 in another embodiment is part of the resources management system.

Resource Manager Service 108 and Profile Manger Service 110

As stated above, the service manager includes two sub-components: a resource manager service 108 and a profile manager service 110.

Resource Manager Service 108

The role of the resource manager service 108 is to survey a pool of voice transcription servers 104a-n, record the status of each of the voice transcription servers 104a-n, and determine which voice transcription server should handle each particular request from a client device 100. Each voice transcription server 104a-n can join and leave the pool of servers freely for any of a variety of reasons including maintenance, availability, and more.

The resource manager 108 uses an algorithm for the selection of a voice transcription server 104a-n, which is based on the factors of the voice transcription server 104a-n voice transcription ability, the network bandwidth, the distance (proximity) between voice servers and the client device, and other similar pertinent factors. These factors are more fully described in the following sections below. The transcription time is used as the decision criteria, which includes two parts:

1) traffic time and
2) transcription process time.

The following is an example of a cost function (c(d,b,u)) with variables of distance between a client device 100 and a voice transcription server 104a-n denoted (d(client,server)), the network traffic bandwidth from a client device 100 to a transcription server 104a-n denoted (b(client,server)), and the available computation resource of a transcription resource denoted (u(server)). The selected voice transcription server is preferably the one with the lowest c(d,b,u) value of all the available voice transcription servers.

The expression of the exemplary cost function is:

$$c(d, b, u) = \alpha \frac{d(\text{client, server})}{b(\text{client, server})} + \beta \frac{1}{u(\text{server})}$$

where $\alpha$, $\beta$ are weighted variables. Following is an example of selection of d(client,server), b(client,server), and u(server).

The first factor addressed is the determination of the distance between the client device 100 and voice transcription server 104a-n. There are multiple ways of defining the distance and although distance is typically related to geographic distance, the present invention is not limited to this definition. For example, distance can be defined as 1) the geographic distance between the client device and voice transcription server; 2) the distance of the actual cable routes between the client device and the voice transcription server; 3) the number of trace-route hops from the client to the voice transcription server; and 4) the difference of the geographic areas of the client device and voice transcription server location. In the preferred embodiment, method 2 is selected as the distance for the cost function.

The second factor is the network traffic bandwidth from a client device 100 to a distributed voice transcription server 104a-n. In this calculation it is assumed that the distributed voice transcription server 104a-n is located at the backbone of the network 114 and that the voice transcription server has enough network bandwidth to accept the requirements from the clients. The traffic bandwidth is limited by the outbound traffic from a client device 100 to its ISP (Internet service provider) or wireless network base station (if the client device is a pervasive device using wireless). In other embodiments, the network connection 114 to each distributed voice transcription server 104a-n is not uniform bandwidth which becomes one of the variables in the cost function above.

The third step is to find the computation resources for a voice transcription server. Here, it is assumed that all the voice transcription servers 104a-n have substantially the same hardware configuration where the performance is mainly determined by the available system CPU, I/O bandwidth, and memory resources. The state of the CPU resources can be one of the following:

1. Inactive
2. Active with no job
3. Active with job but allow more job
4. Active with job(s) but not allow more job Again as noted above, it is not necessary for the voice transcription server 104a-n to be similar in capabilities to be within the true scope and spirit of the present invention. Other factors for determining resource allocations to a voice transcription server 104a-n shown to be used advantageously with the present invention include the format of the audio stream e.g. MPEG versus WAV, whether the audio stream is compressed or not, a priority given to a particular client device 100, the financial cost to run or lease a given voice transcription server 104a-n or any other variable or factor which can be measured in a distributed network and/or grid computing environment.

Profile Manager Service 110

A voice profile characterizes various speech properties of an end user, such as, for example, accents, dialects, inflective variations, or other pronunciation habits of the end user. Such speech properties may be determined by a training program, wherein a user speaks various sample words and phrases such that applicable speech processing algorithms learn to more accurately process the user's speech.

The voice profiles are stored in profile file and managed by the profile manager service 110, corresponding to the end users are stored in the profile manager 124. Each profile has a state value and a set of property values. The state of a profile specifies the status of the training process for the profile. The property values specify the details of the profile. The exemplary states of a profile include:

1. Not enrolled
2. Not finished
3. Finished with basic training
4. Finished with extended training The property values of a profile and its state is used for deployment of the profile for purposes of voice transcription and profile creation (training). If no profile is created or available for an end user, a default profile is used for the transcription.

Voice Transcription Server 104a-n

Each voice transcription server 104 has a voice format converter 124, a local profile manager 126, and voice transcription engine 128.

Voice Format Converter 124

Many formats for compressing and transmitting data are well known in the art. As the name suggests, the voice format converter converts the user input audio formats to the format(s) accepted by the voice transcription engine. Compressed formats include MPEG, AVI, and both lossless and lossy compression.

In a preferred embodiment, a simple algorithm is used to determine whether compression of a voice stream is needed, based on the tradeoff of the compression time and transmission time. In the following formula, L denotes an audio stream length, and B denotes an available network bandwidth from client device to the assigned voice transcription server. The compression time is assumed to be proportional to L at the client side (for example, a pervasive device). The uncompression at the voice transcription server 104a-n side is ignored by assuming that the server 104a-n has enough computational capacity to rapidly uncompress the audio stream. By assuming a compression ratio as λ, the time required to deliver the audio stream without compression is:

$$t_1 = \frac{L}{B}$$

With the compression it is $$t_2 = \frac{\lambda L}{B} + \gamma L$$

The decision is made by the client device to compute the value of $$\left(\frac{1}{B}\right) \text{ and } \left(\frac{\lambda}{B} + \gamma\right)$$

Local Profile Manager 110

Once a voice transcription server is selected for a requested transcription task, the profile management service 110 transfers a copy of the trained voice profile (or default profile if no trained profile is available) over network 114 to the selected voice transcription server. The default profile also could be stored at each individual transcription server to save time. Furthermore, all the profiles could be pre-deployed at each individual transcription server if the transcription server has enough storage space. A local profile manager 112 within the voice transcription server 104 manages all the profiles temporarily or permanent stored at the voice transcription server 104. Since a single voice transcription server can process many transcriptions simultaneously, the local profile manager 112 may store many profiles at any given time.

Voice Transcription Engine 128

The voice transcription engine 128 is a software service or dedicated hardware that transcribes the incoming voice to text using the end-user voice profile or a pre-defined default voice profile as described above. Voice transcription software to implement voice transcription engine 128 includes voice transcription product available from IBM, AT&T, Dragon Systems, Microsoft and others including.

The voice transcription servers can be identified by their hostname or IP address and a set of pre-defined ports to support the communications between the other components of the system.

Client Devices 100

It is the client device 100 that is the voice audio input to the system of the present invention. Each lightweight client 100 is identified by two attributes: a) the ID of the device (which could be the IP address of the device); and b) the end-user ID. The end-user ID may be anonymous, applied to anybody who does not have a profile or does not wish to use his/her profile. For the case of using anonymous ID, the default profile will be used by the transcription server. The end-user ID can be retrieved from the login process or entered by the end-user while using the system.

Process Flow on Service Manager for Pervasive Client Device

Figure 3:
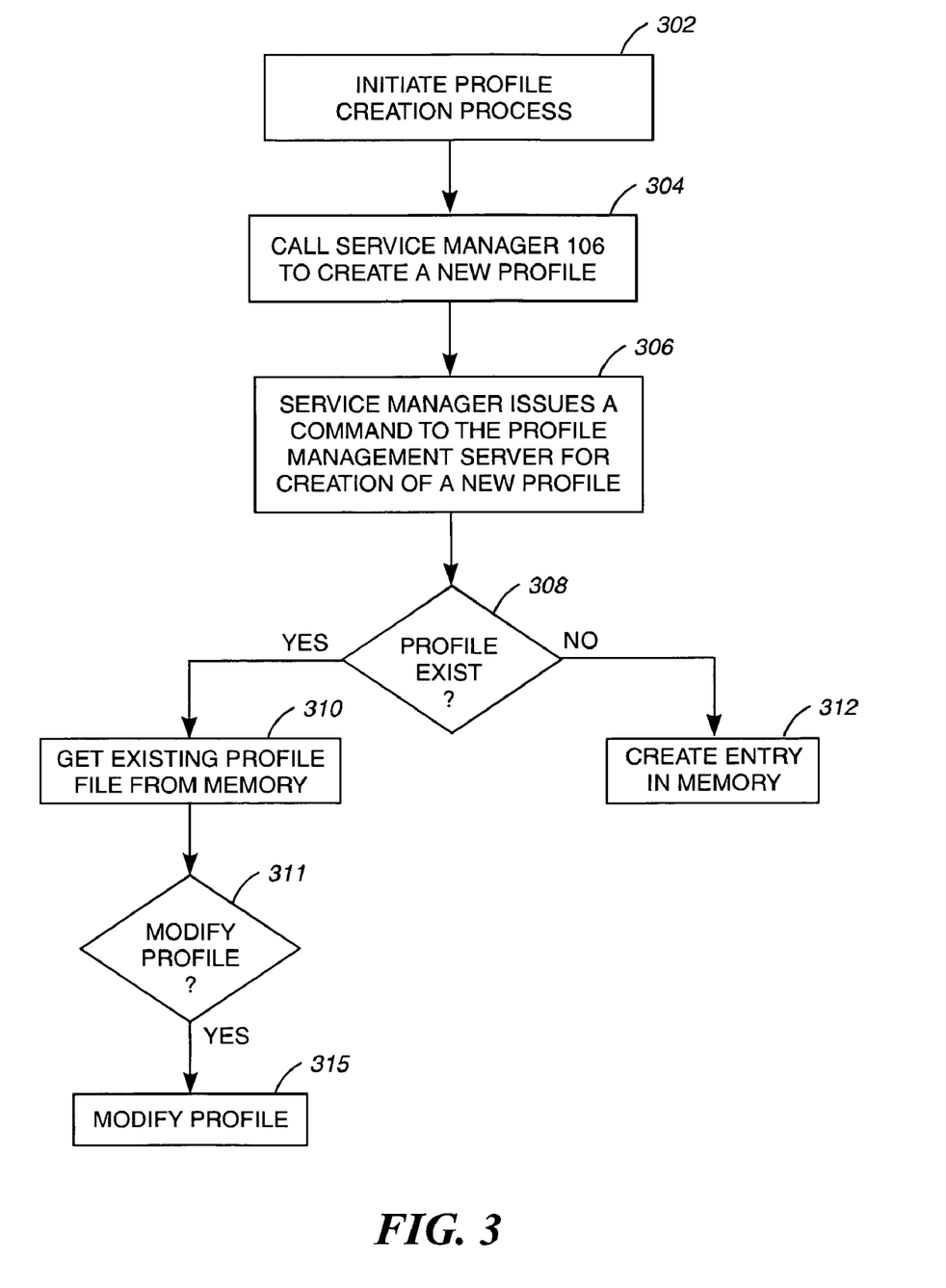
FIG. 3 is a flow diagram illustrating a method of converting speech to text, according to the present invention.

FIG. 3 illustrates a method of voice transcription using a pervasive client device in accordance with the present invention. In the first step (302) a user operating a client device 100 initiates the profile creation process, which includes speaking into the device 100 according the particular training program. The device 100 then makes a call to the service manager 106 to create a new profile (step 304). In the next step (306), the service manager 106 issues a command to the profile management service 110 for creation of a new profile. The profile management service 110 checks for an existing profile for the requesting user (step 308).

If a profile exists, the existing profile is retrieved from the profile repository (step 310). The profile repository usually is but not limited to a file system or a relational database. Existing profiles can have several states, which include "not finished", "finished with basic training", and "finished with extended training". If the profile is not "finished with extended training", the profile can be modified to enhance the transcription results. In this circumstance, the user is asked (step 311) whether the profile should be modified. If the answer is yes, the profile is modified (step 315).

The profiles can be stored and transmitted in a compressed format to preserve network resources (such as bandwidth or repository space). If no profile exists in the profile management service 110, an entry in the profile repository 204 of the profile management service 110 is created and the new profile is stored (step 312).

Figure 4:
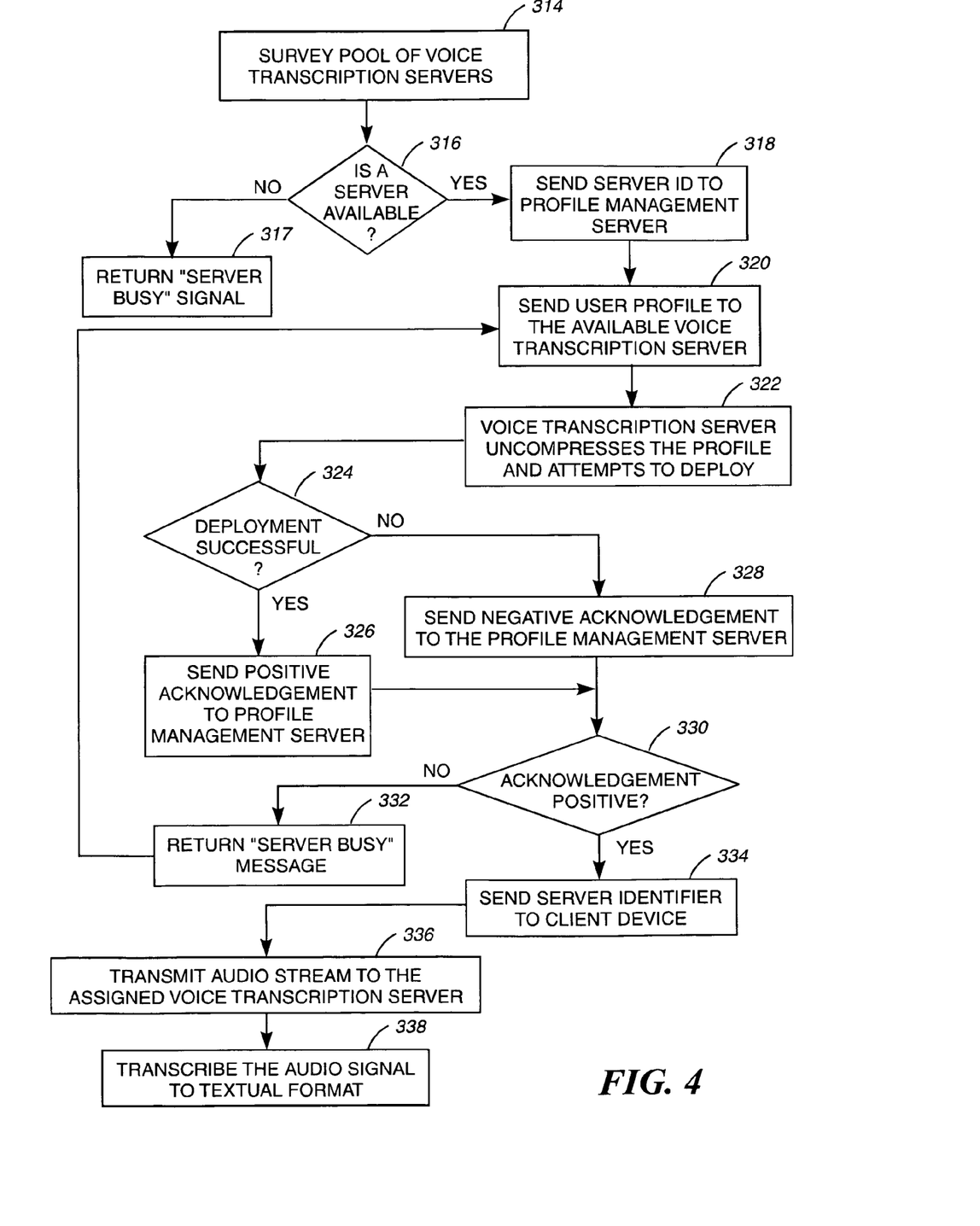
FIG. 4 is an overall system diagram illustrating one embodiment of a voice transcription system using a web-browser client device in accordance with the present invention.

Referring now to FIG. 4, after the profile is stored, or if the user indicates that he does not wish to create a profile, the resource management service 108 is called upon to survey the pool of voice transcription servers 104*a-n* to get an identifier of a voice transcription server at an acceptable location and with the resources available to perform the necessary transcription (step 314). The system then waits to see if a server is available (step 316). If a server is not available, a "server busy" signal is returned and step 314 must be repeated (step 317). If a server is available, the server identification is sent to the profile management service 110 (step 318). The profile management service 110 then sends the user profile or profile identifier (if the profile has been preloaded) to the available voice transcription server (step 320).

For the case of transferring the profile, the voice transcription server uncompresses the profile and attempts to deploy it (step 322). If the deployment is successful (324), a positive acknowledgement is sent to profile management service 110 (step 326). If deployment is unsuccessful, a negative acknowledgement is sent to the profile management service 110 (step 328).

If the acknowledgement is positive, a server identifier, or address, is sent to the requesting client device 100 (step 334). If the acknowledgement is unsuccessful, a "deployment failed" message is returned (step 332) and the profile is sent again (step 320). Provided the deployment of the user profile was successful and the client device 100 received the address of the voice transcription server holding the profile, the pervasive client device 100 then transmits an audio stream (either from microphone recording or other methods—such as read from an audio file) to the assigned voice transcription server with the ID of the device and the ID of the end-user (step 336). The audio stream can be transferred at the same time the end-user is recording to expedite the speed of communications between the lightweight client and voice transcription server. The voice transcription server, utilizing the trained voice profile, can then transcribe the audio stream to a textual format (step 334).

Flow for Web Browser Client

Figure 5:
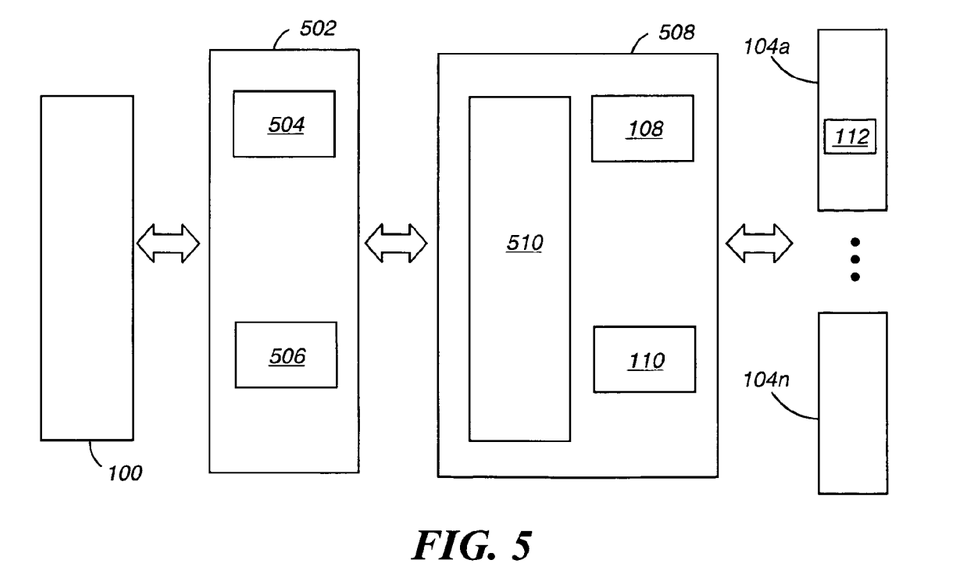
FIG. 5 is a flow diagram illustrating a method of converting speech to text in accordance with the present invention.

A web browser client gets the voice services using applet technology. FIG. 5 shows an embodiment of the present invention using a web-browser client device 100. The web-browser client device 100 communicates with a web container 502, which includes a servlet 504. To minimize the code downloaded, a proxy structure for the web-browser clients is utilized. A proxy is a servlet 504 running at a server machine, which contact with resource management center and profile management center. There could be one or more proxies based on the scalability requirements of the application.

The web container 502 also includes a user interface 506 that can be loaded onto the web-browser client device 100. The web container 502 communicates with the service manager 508, which includes a resource management service 108, a profile management service 110, and a resources management web services application programming interface (API) 510. The system also includes a pool of voice transcription servers 104*a-n*.

Figure 6:
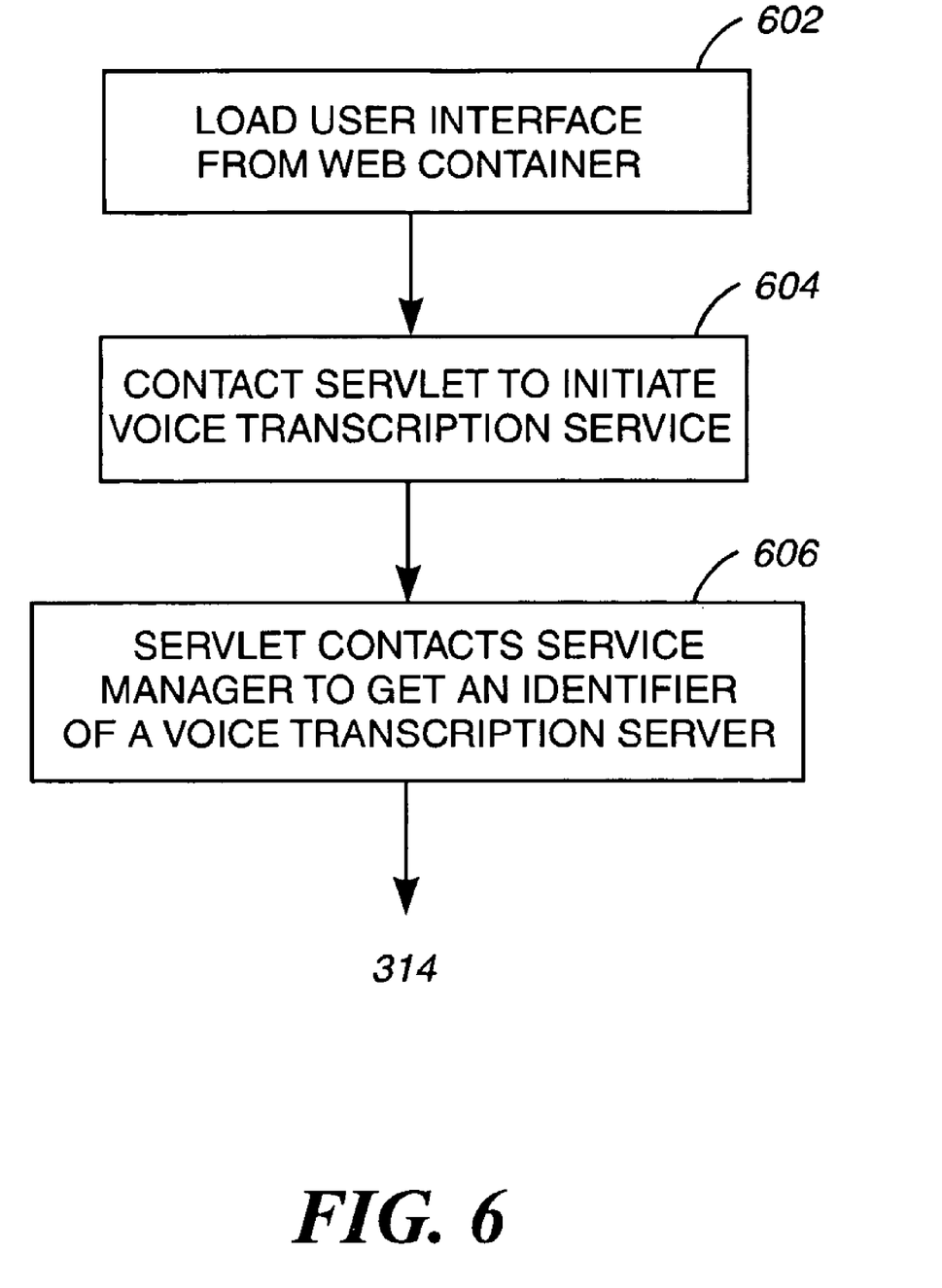
FIG. 6 is a flow diagram illustrating a method of voice transcription using a web-browser client device in accordance with the present invention.

FIG. 6 illustrates a method of voice transcription using a web-browser client device in accordance with the present invention. The web-browser client 100 loads a user interface 506 from the web container 502 (step 602). The web-browser client 100 then contacts the servlet 504 to initiate the voice transcription service (step 604). The servlet 504 functions similar to the pervasive client, described above, and contacts the service manager 508 to create a new voice profile and/or get an identifier of a voice transcription server 104*a-n* (step 606). The process then follows that shown in FIG. 4, beginning at step 314.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for managing voice-to-text transcription services in a distributed computer environment comprising at least one network interconnecting a service management server capable of assisting a plurality of client devices in requests for voice-to-text transcription, and a plurality of transcription servers capable of performing speech recognition on audio data, the method comprising:
    receiving, at the service management server, a transcription request from a client device operated by a user;
    determining a transcription time for at least one transcription server of the plurality of transcription servers to perform a transcription for the transcription request, wherein the transcription time is determined based, at least in part, on a distance between the client device and the at least one transcription server, a network traffic bandwidth between the client device and the at least one transcription server, and a measure of available computation resources of the at least one transcription server;
    selecting, by the service management server, a transcription server from the plurality of transcription servers for performing the transcription for the transcription request, wherein the transcription server is selected based, at least in part, on the transcription time determined for the at least one transcription server; and
    providing, by the service management server to the client device, a network address of the selected transcription server to which the client device may provide audio data to be transcribed by the selected transcription server.

2. The method according to claim 1, further comprising:
    storing at least one voice profile in a profile management service located within the service management server.

3. The method according to claim 2, further comprising:
    assigning a status to the at least one voice profile, the status indicating that the at least one voice profile is not enrolled, not finished, finished with basic training or finished with extended training; and
    storing the status of the at least one voice profile in the profile management service.

4. The method according to claim 1, further comprising:
    assigning a status to each transcription server in the plurality of transcription servers that indicates that the transcription server is inactive, active with no job, active with a job but will allow more jobs or active with jobs and will not allow additional jobs.

5. The method according to claim 4, further comprising:
    creating a record of the status of each transcription server of the plurality of transcription servers; and updating the record when a transcription server is assigned for a transcription task and/or a transcription task has been completed.

6. The method according to claim 1, further comprising:
querying the at least one transcription server of the plurality of transcription servers for cost, wherein cost includes a distance between the client device and the voice transcription server, a network traffic bandwidth from the client device to the transcription server and/or available transcription computation resources.

7. The method according to claim 6, wherein distance is defined as a geographic distance between the client device and the transcription server, a quantity of hop numbers from the client device to the transcription server and/or a difference of the geographic areas of the client device and transcription server location.

8. The method of claim 1, further comprising:
obtaining, by the service management server, a voice profile associated with the user, the voice profile including at least some speech properties associated with the user; and
providing, by the service management server, the voice profile to the selected transcription server.

9. The method according to claim 8, wherein the voice profile, prior to the transcription request being received, has been assigned a state identifier that indicates whether the voice profile is not enrolled, not finished, finished with basic training, or finished with extended training.

10. The method of claim 8, wherein obtaining a voice profile associated with the user comprises:
determining whether the user is associated with an existing voice profile; and
using a default voice profile as the voice profile for the user in response to determining that the user is not associated with an existing voice profile.

11. At least one non-transitory computer readable medium storing instructions that, when executed by at least one processor, perform a method for managing voice-to-text transcription services in a distributed computer environment comprising at least one network interconnecting a service management server capable of assisting a plurality of client devices in requests for voice-to-text transcription, and a plurality of transcription servers each capable of performing speech recognition on audio data, the method comprising:
receiving, at the service management server, a transcription request from a client device operated by a user;
determining a transcription time for at least one transcription server of the plurality of transcription servers to perform a transcription for the transcription request, wherein the transcription time is determined based, at least in part, on a distance between the client device and the at least one transcription server, a network traffic bandwidth between the client device and the at least one transcription server, and a measure of available computation resources of the at least one transcription server;
selecting, by the service management server, a transcription server from the plurality of transcription servers for performing the transcription for the transcription request, wherein the transcription server is selected based, at least in part, on the transcription time determined for the at least one transcription server; and
providing, by the service management server to the client device, a network address of the selected transcription server to which the client device may provide audio data to be transcribed by the selected transcription server.

12. The at least one computer readable medium of claim 11, wherein the method further comprises:
obtaining, by the service management server, a voice profile associated with the user, the voice profile including at least some speech properties associated with the user; and
providing, by the service management server, the voice profile to the selected transcription server.

13. The at least one computer readable medium of claim 12, wherein obtaining a voice profile associated with the user comprises:
determining whether the user is associated with an existing voice profile; and
using a default voice profile as the voice profile for the user in response to determining that the user is not associated with an existing voice profile.

14. The at least one computer readable medium of claim 12, wherein the voice profile, prior to the transcription request being received, has been assigned a state identifier that indicates whether the voice profile is not enrolled, not finished, finished with basic training or finished with extended training.

15. The at least one computer readable medium of claim 11, wherein the method further comprises:
storing at least one voice profile in a profile management service located within the service management server.

16. The at least one computer readable medium of claim 15, wherein the method further comprises:
assigning a status to the at least one voice profile, the status indicating that the at least one voice profile is not enrolled, not finished, finished with basic training or finished with extended training; and
storing the status of the at least one voice profile in the profile management service.

17. The at least one computer readable medium of claim 11, wherein the method further comprises:
assigning a status to each transcription server in the plurality of transcription servers that indicates that the transcription server is inactive, active with no job, active with a job but will allow more jobs or active with jobs and will not allow additional jobs.

18. The at least one computer readable medium of claim 17, wherein the method further comprises:
creating a record of the status of each transcription server of the plurality of transcription servers; and
updating the record when a transcription server is assigned for a transcription task and/or a transcription task has been completed.

19. The at least one computer readable medium of claim 11, wherein the method further comprises:
querying the at least one transcription server of the plurality of transcription servers for cost, wherein cost includes a distance between the client device and the voice transcription server, a network traffic bandwidth from the client device to the transcription server and/or available transcription computation resources.

20. The at least one computer readable medium of claim 19, wherein distance is defined as a geographic distance between the client device and the transcription server, a quantity of hop numbers from the client device to the transcription server and/or a difference of the geographic areas of the client device and transcription server location.

21. A system for managing voice-to-text transcription services in a distributed computer environment comprising at least one network interconnecting a service management server capable of assisting a plurality of client devices in requests for voice-to-text transcription, and a plurality of transcription servers each capable of performing speech recognition on audio data, the system comprising:

at least one computer programmed to:
- receive a transcription request from a client device operated by a user;
- determine a transcription time for at least one transcription server of the plurality of transcription servers to perform a transcription for the transcription request, wherein the transcription time is determined based, at least in part, on a distance between the client device and the at least one transcription server, a network traffic bandwidth between the client device and the at least one transcription server, and a measure of available computation resources of the at least one transcription server;
- select a transcription server from the plurality of transcription servers for performing the transcription for the transcription request, wherein the transcription server is selected based, at least in part, on the transcription time determined for the at least one transcription server; and
- provide to the client device, a network address of the selected transcription server to which the client device may provide audio data to be transcribed by the selected transcription server.

22. The system of claim 21, wherein the at least one computer is further programmed to:
- obtain a voice profile associated with the user, the voice profile including at least some speech properties associated with the user; and
- provide the voice profile to the selected transcription server.

23. The system of claim 22, wherein the at least one computer is further programmed to:
- determine whether the user is associated with an existing voice profile; and
- select a default voice profile as the voice profile for the user in response to determining that the user is not associated with an existing voice profile.

24. The system of claim 22, wherein the voice profile, prior to the transcription request being received, has been assigned a state identifier that indicates whether the voice profile is not enrolled, not finished, finished with basic training or finished with extended training.

25. The system of claim 21 wherein the at least one computer is further programmed to:
- store at least one voice profile in a profile management service located within the service management server.

26. The system of claim 25, wherein the at least one computer is further programmed to:
- assign a status to the at least one voice profile, the status indicating that the at least one voice profile is not enrolled, not finished, finished with basic training or finished with extended training; and
- store the status of the at least one voice profile in the profile management service.

27. The system of claim 21, wherein the at least one computer is further programmed to:
- assign a status to each transcription server in the plurality of transcription servers that indicates that the transcription server is inactive, active with no job, active with a job but will allow more jobs or active with jobs and will not allow additional jobs.

28. The system of claim 27, wherein the at least one computer is further programmed to:
- create a record of the status of each transcription server of the plurality of transcription servers; and
- update the record when a transcription server is assigned for a transcription task and/or the transcription task has been completed.

29. The system of claim 21, wherein the at least one computer is further programmed to:
- query the at least one transcription server of the plurality of transcription servers for cost, wherein cost includes a distance between the client device and the voice transcription server, a network traffic bandwidth from the client device to the transcription server and/or available transcription computation resources.

30. The system of claim 29, wherein distance is defined as a geographic distance between the client device and the transcription server, a quantity of hop numbers from the client device to the transcription server and/or a difference of the geographic areas of the client device and transcription server location.

* * * * *